US011501550B2

(12) United States Patent
Yuan et al.

(10) Patent No.: US 11,501,550 B2
(45) Date of Patent: Nov. 15, 2022

(54) OPTICAL CHARACTER RECOGNITION SEGMENTATION

(71) Applicant: INTERNATIONAL BUSINESS MACHINES CORPORATION, Armonk, NY (US)

(72) Inventors: Zhong Fang Yuan, Xian (CN); Yu Pan, Shanghai (CN); Tong Liu, Xian (CN); Yi Chen Zhong, Shanghai (CN); Li Juan Gao, Xian (CN); Qiong Wu, Shanghai (CN); Dan Dan Wu, Wuhan (CN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 17/247,032

(22) Filed: Nov. 24, 2020

(65) Prior Publication Data

US 2022/0164572 A1 May 26, 2022

(51) Int. Cl.
*G06V 30/414* (2022.01)
*G06F 40/166* (2020.01)
(Continued)

(52) U.S. Cl.
CPC .......... *G06V 30/414* (2022.01); *G06F 40/166* (2020.01); *G06V 10/40* (2022.01);
(Continued)

(58) Field of Classification Search
CPC .... G06V 30/10; G06V 30/274; G06V 30/413; G06V 30/414; G06V 10/40; G06F 40/166
See application file for complete search history.

(56) References Cited

U.S. PATENT DOCUMENTS 7,469,063 B2 * 12/2008 Koyama ............ G06V 30/2455
382/187
8,509,534 B2 8/2013 Galic
(Continued)

FOREIGN PATENT DOCUMENTS

CN 111340037 A 6/2020
CN 111680688 A 9/2020
(Continued)

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Daniel G Mariam
(74) *Attorney, Agent, or Firm* — Schmeiser, Olsen & Watts, LLP; Christopher Pignato

(57) ABSTRACT

A method, system, and computer program product for segmenting and processing documents for optical character recognition is provided. The method includes receiving a document and detecting different types of text data. The document is divided into a plurality of text regions associated with the different types of said text data. Optical noise is removed from each text region and differing optical character recognition software code is selected for application to each text region. The differing optical character recognition software code is executed with respect to each text region resulting in extractable computer readable text located within each said text region.

18 Claims, 10 Drawing Sheets

(51) Int. Cl.
*G06V 10/40* (2022.01)
*G06V 30/262* (2022.01)
*G06V 30/413* (2022.01)
*G06V 30/10* (2022.01)

(52) U.S. Cl.
CPC .......... *G06V 30/274* (2022.01); *G06V 30/413* (2022.01); *G06V 30/10* (2022.01)

(56) References Cited

U.S. PATENT DOCUMENTS

| | | | |
|---|---|---|---|
| 9,292,739 B1* | 3/2016 | Gray | G06V 10/987 |
| 10,095,925 B1* | 10/2018 | Tripuraneni | G06V 30/1473 |
| 2007/0268501 A1* | 11/2007 | Jiang | G06T 7/194 |
| | | | 358/1.9 |
| 2008/0123945 A1 | 5/2008 | Andrew | |
| 2011/0255782 A1 | 10/2011 | Welling | |
| 2012/0134589 A1* | 5/2012 | Reddy | G06K 9/6292 |
| | | | 382/182 |
| 2017/0337443 A1 | 11/2017 | Kolton et al. | |
| 2019/0172041 A1* | 6/2019 | Hill | G06Q 20/202 |

FOREIGN PATENT DOCUMENTS

| | | |
|---|---|---|
| RU | 2656708 C1 | 6/2018 |
| WO | 2017214073 A1 | 12/2017 |

OTHER PUBLICATIONS

Namboodiri, Anoop M. et al.; Document Structure and Layout Analysis. In: Chaudhuri B.B. (eds) Digital Document Processing. Advances in Pattern Recognition. Springer, London. (2007) https://doi.org/10.1007/978-1-84628-726-8_2; 17 pages.

Breuel Thomas M et al., Robust, Simple Page Segmentation Using Hybrid Convolutional MDLSTM Networks, 2017 14th IAPR International Conference on Document Analysis and Recognition (ICDAR), IEEE, vol. 1, (Nov. 9, 2017), pp. 733-740, XP033307847, DOI: 10.1109/ICDAR.2017.125; retrieved on Jan. 25, 2018.

Mo Jiawei et al., A convolution-based approach for fixed-pattern noise removal in OCR, 2018 International Conference on Artificial Intelligence and Big Data (ICAIBD), IEEE, (May 26, 2018), pp. 134-138, XP033367005, DOI: 10.1109/ICAIBD.2018.8396181, retrieved on Jun. 25, 2018.

Combined search and examination report, dated Jul. 11, 2022; Application No. GB2116057.7, 13 pages.

* cited by examiner

OPTICAL CHARACTER RECOGNITION SEGMENTATION

BACKGROUND

The present invention relates generally to a method for segmenting a document for optical character recognition and in particular to a method and associated system for improving optical character recognition software technology associated with detecting, evaluating, and dividing an electronic document structure into multiple regions for extracting computer readable text within regions of the electronic document structure.

SUMMARY

A first aspect of the invention provides an optical character recognition segmentation and processing method comprising: receiving, by a processor of a hardware device, a document for processing; detecting, by the processor, different types of text data of the document; dividing, by the processor, the document into a plurality of text regions associated with the different types of the text data, wherein each text region of the plurality of text regions comprises a single type of the text data; removing, by the processor, optical noise from each the text region; selecting, by the processor, differing optical character recognition software code for application to each the text region and executing, by the processor in response to the selecting, the differing optical character recognition software code with respect to each the text region resulting in extractable computer readable text within each the text region.

A second aspect of the invention provides a computer program product, comprising a computer readable hardware storage device storing a computer readable program code, the computer readable program code comprising an algorithm that when executed by a processor of a hardware device implements an optical character recognition segmentation and processing method, the method comprising: receiving, by the processor, a document for processing; detecting, by the processor, different types of text data of the document; dividing, by the processor, the document into a plurality of text regions associated with the different types of the text data, wherein each text region of the plurality of text regions comprises a single type of the text data; removing, by the processor, optical noise from each the text region; selecting, by the processor, differing optical character recognition software code for application to each the text region and executing, by the processor in response to the selecting, the differing optical character recognition software code with respect to each the text region resulting in extractable computer readable text within each the text region.

A third aspect of the invention provides a hardware device comprising a processor coupled to a computer-readable memory unit, the memory unit comprising instructions that when executed by the processor implements an optical character recognition segmentation and processing method comprising: receiving, by the processor, a document for processing; detecting, by the processor, different types of text data of the document; dividing, by the processor, the document into a plurality of text regions associated with the different types of the text data, wherein each text region of the plurality of text regions comprises a single type of the text data; removing, by the processor, optical noise from each the text region; selecting, by the processor, differing optical character recognition software code for application to each the text region and executing, by the processor in response to the selecting, the differing optical character recognition software code with respect to each the text region resulting in extractable computer readable text within each the text region.

The present invention advantageously provides a simple method and associated system capable of accurately segmenting a document for optical character recognition.

DETAILED DESCRIPTION

Figure 1:
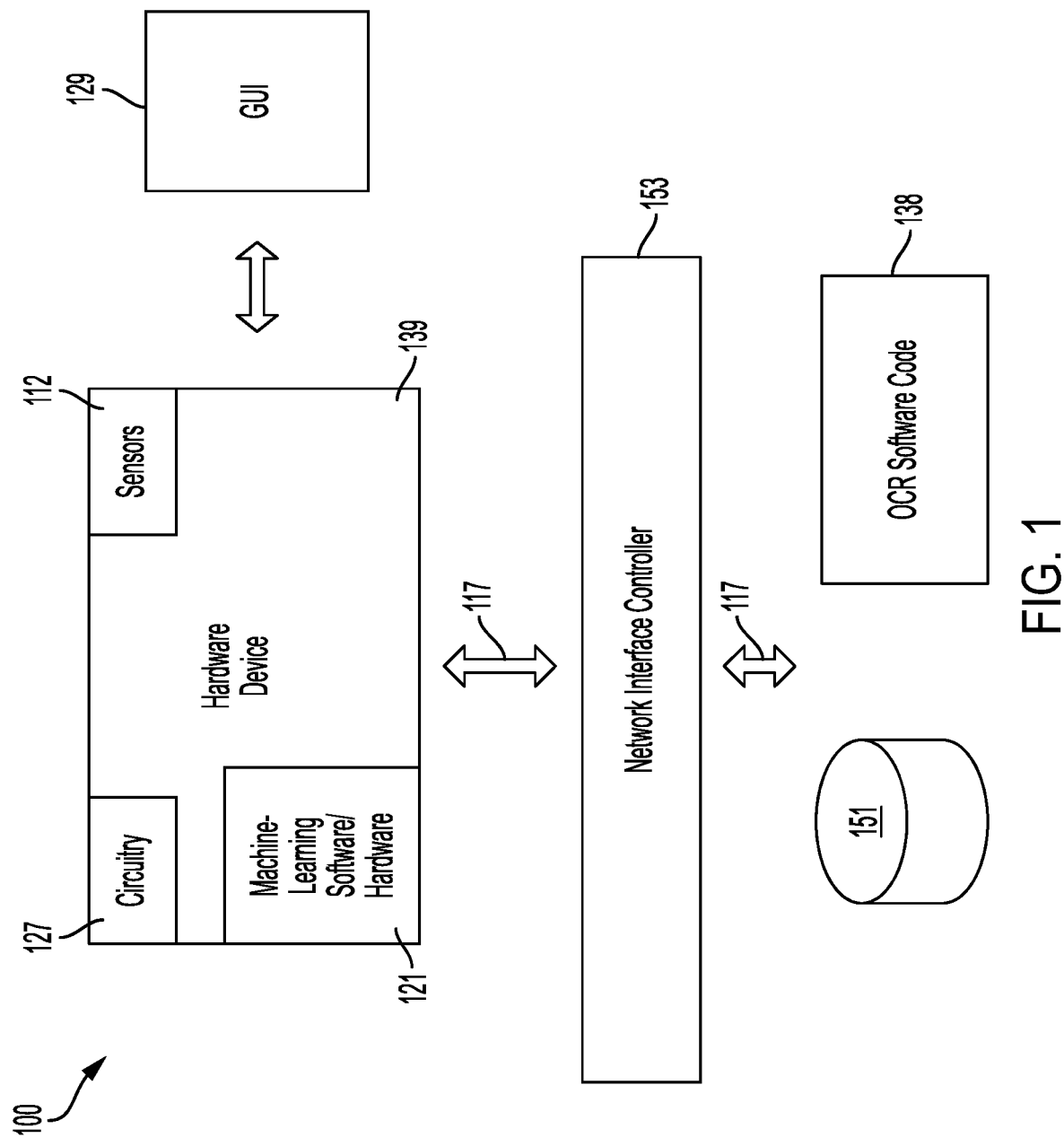
FIG. 1 illustrates a system for improving optical character recognition software technology associated with detecting, evaluating, and dividing an electronic document structure into multiple regions for extracting computer readable text within regions of the electronic document structure, in accordance with embodiments of the present invention.

FIG. 1 illustrates a system 100 for improving optical character recognition software technology associated with detecting, evaluating, and dividing an electronic document structure into multiple regions for extracting computer readable text within regions of the electronic document structure, in accordance with embodiments of the present invention. Typical optical character recognition (OCR) processes may encounter complex document layout data/text types such as, inter alia, printed text, curved seal text, slanted text, tables, handwriting, etc. appearing within a same document at a same time. Therefore, a single OCR recognition model may not comprise an ability to effectively recognize and process multiple data/text types because associated models and external interfaces suitable for the data/text types are likewise different. Therefore, system 100 enables a process for detecting the different data/text types to be divided for execution via different models and combining to generate final results. Additionally, a typical OCR algorithm may not functionally support a traceability of recognized text (e.g., whether the recognized text comes from a form, text, handwriting, or a seal. Therefore, system 100 is configured to identify multiple types of text from complex layout data and trace a source of the recognized text.

System 100 enables the following modules executed via hardware device 139:

1. A cognitive OCR module for detecting different types of layout data/text based on image semantic segmentation technology.
2. An OCR recognition algorithm dispatcher module for dispensing different types of data/text to a most suitable OCR recognition algorithm.
3. A noise removal module for removing noise based on a self-attention mechanism which may effectively remove noise of a segmentation unit.

System 100 enables an advantageous process for enabling an OCR component with respect to complex data/text layouts. Likewise, system 100 enables a noise removal process based on a self-attention mechanism for effectively removing any noise of a segmentation unit. A text recognition process (enabled by system 100) is configured to recommend a most suitable recognition algorithm for adapting to complex font recognition situations.

System 100 of FIG. 1 includes a hardware device 139 (i.e., specialized hardware), OCR software code 138 (e.g., within a data storage device), a database 151, and a network interface controller 153 interconnected through a network 117. Hardware device 139 includes specialized circuitry 127 (that may include specialized software), sensors 112, and machine learning software code/hardware structure 121 (i.e., including machine learning software code). Interface controller 153 may include any type of device or apparatus for securely interfacing hardware and software to a network. OCR software code 138 comprises different types of software for executing different OCR processes with respect to different types of data and/or text of an electronic document. Sensors 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Hardware device 139 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 139 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-10. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving optical character recognition software technology associated with detecting, evaluating, and dividing an electronic document structure into multiple regions for extracting computer readable text within regions of the electronic document structure. Network 117 may include any type of network including, inter alia, a 5G telecom network, a local area network, (LAN), a wide area network (WAN), the Internet, a wireless network, etc. Alternatively, network 117 may include an application programming interface (API).

System 100 is enabled to execute an OCR recognition method based on pre-semantic segmentation that includes the following steps:

1. Enabling a cognitive OCR mechanism to detect different types of layout data/text based on image semantic segmentation technology.
2. Enabling an OCR recognition algorithm dispatcher to dispense the different types of layout data/text with respect to a most suitable OCR recognition algorithm.
3. Executing a noise removal technique based on a self-attention mechanism used to effectively remove noise of a segmentation unit.
4. Utilizing an image semantic segmentation algorithm with respect to different text regions and utilizing an image denoising algorithm based on a self-attention mechanism.
5. After the image semantic segmentation algorithm is executed, a classification operation is performed, such that classified categories of algorithm indexes of different recognition methods and each algorithm index is associated with a specified algorithm. Subsequently, a most suitable recognition algorithm is selected for an associated region.
6. Utilizing a classification algorithm to recommend classification types for different independent semantic units.

Figure 2:
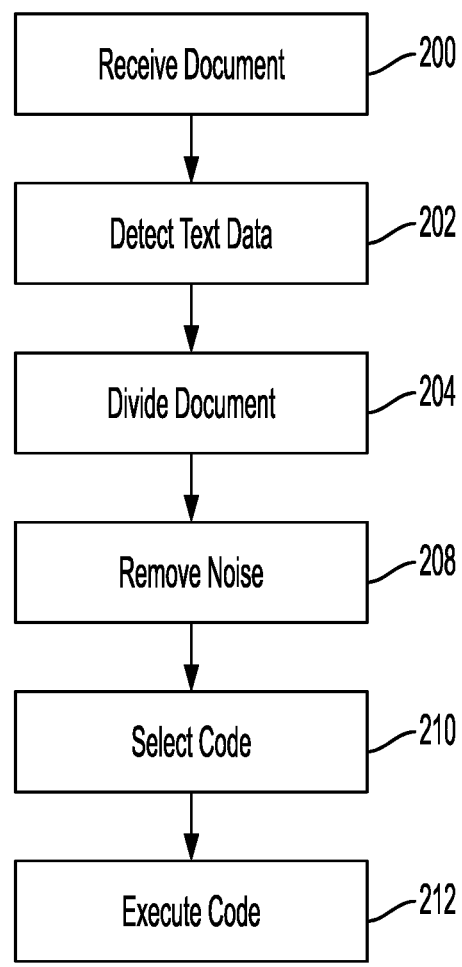
FIG. 2 illustrates an algorithm detailing a process flow enabled by the system of FIG. 1 for improving optical character recognition software technology associated with detecting, evaluating, and dividing an electronic document structure into multiple regions for extracting computer readable text within regions of the electronic document structure, in accordance with embodiments of the present invention.

FIG. 2 illustrates an algorithm detailing a process flow enabled by system 100 of FIG. 1 for improving optical character recognition software technology associated with detecting, evaluating, and dividing an electronic document structure into multiple regions for extracting computer readable text within regions of the electronic document structure, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 139 and OCR software code 138. In step 200, a document is received (e.g., from database 151 of FIG. 1) for processing. In step 202, different types of text data of the document are detected. The different types of text data may be comprised by a format such as, inter alia, a table format, a watermark format, a handwriting format, and a rotated text format.

In step 204, the document is divided into a plurality of text regions associated with the different types of said text data. Each text region includes a single type of text data. In step 208, optical noise (e.g., unnecessary background text and images of the document) is removed for each text region. The noise removal process may be performed via a self-attenuation mechanism executed via natural language processing. Removing the optical noise from each text region may include:

1. Encoding each text region as a total semantic vector of each text region.
2. Enabling a 3×3 window to divide each text region into multiple sub-regions such that each sub-region of is encoded as a 1×300 vector.
3. Generating (based on the total semantic vector) a dot product for each sub-region. Each dot product comprises a specific score representing an importance level for each sub-region.
4. Comparing each specific score to a score threshold.

5. Deleting (based on results of the comparing) all pixels of each sub-region exceeding the score threshold to perform the noise removal.

In step 210, differing optical character recognition software code is selected for application to each text region. Additionally, each text region may be classified with respect to the single type of text data such that the selection is executed based on results of the classification. Each differing optical character recognition software code instance may include self-learning software code stored in a specialized database (e.g., database 151 of FIG. 1).

In step 212, the differing optical character recognition software code is executed with respect to each text region resulting in extractable computer readable text within each text region. The extractable computer readable text within each text region may be configured for usage with respect to a cut or copy and paste function.

Figure 3:
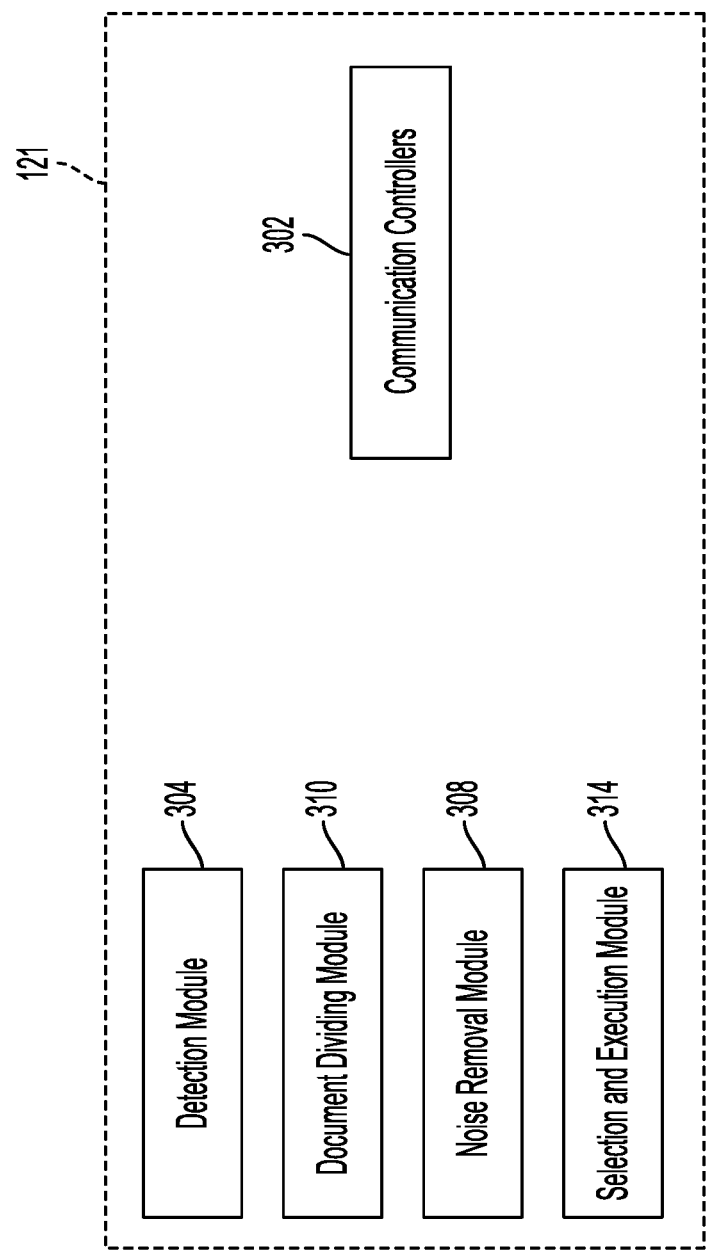
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry 127) of FIG. 1, in accordance with embodiments of the present invention. Machine learning software/hardware structure 121 includes a detection module 304, a document dividing module 310, a noise removal module 308, a selection and execution module 314, and communication controllers 302. Detection module 304 comprises specialized hardware and software for controlling all functions related to the text data type detection steps of FIGS. 1 and 2. Document dividing module 310 comprises specialized hardware and software for controlling all functionality related to the text region dividing functionality for implementing the process described with respect to the algorithm of FIG. 2. Noise removal module 308 comprises specialized hardware and software for controlling all functions related to the noise removal steps of FIG. 2. Selection and execution module 314 comprises specialized hardware and software for controlling all functions related to selecting and executing OCR code. Communication controllers 302 are enabled for controlling all communications between detection module 304, document dividing module 310, noise removal module 308, and selection and execution module 314.

Figure 4:
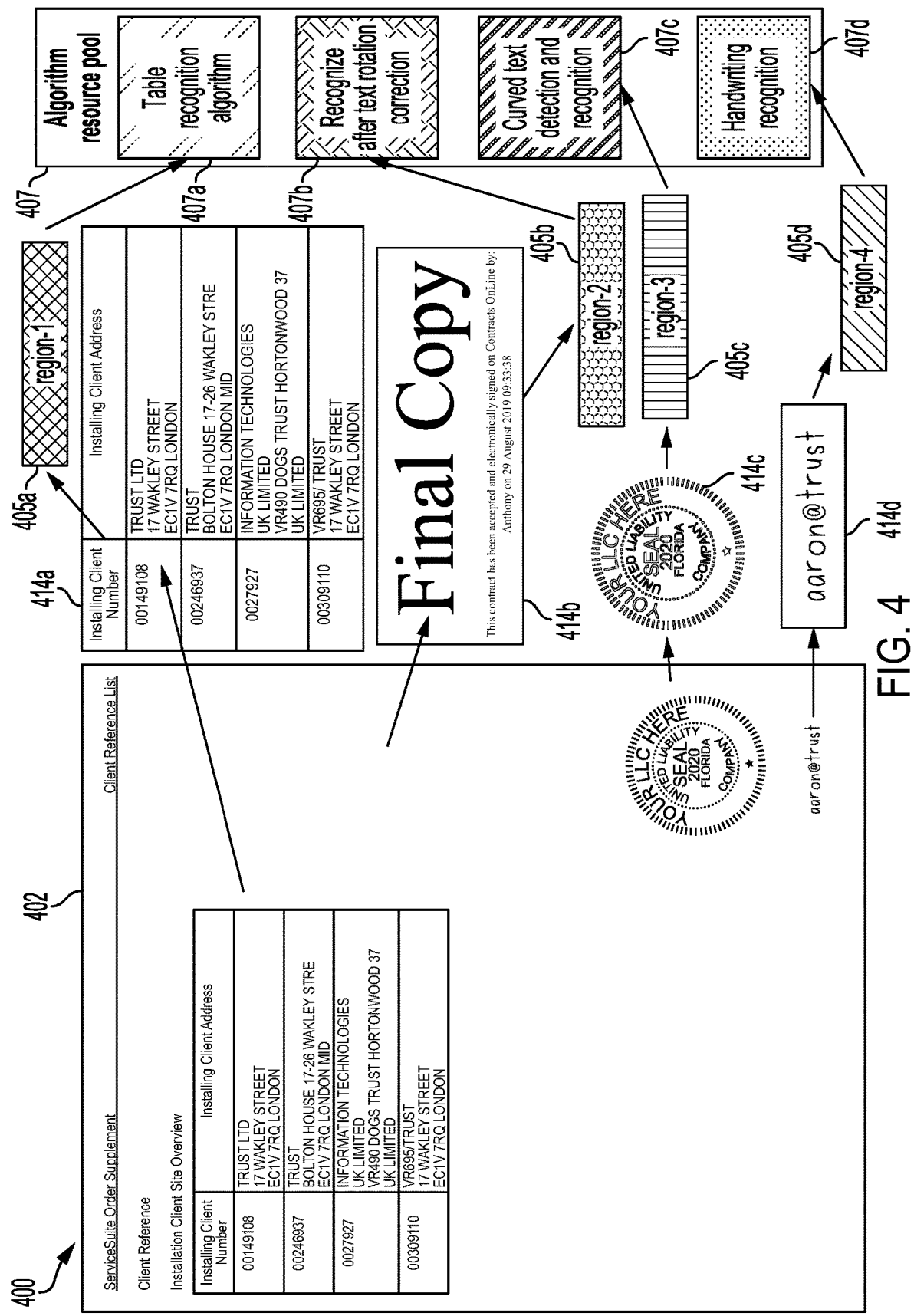
FIG. 4 illustrates an OCR segmentation process, in accordance with embodiments of the present invention.

FIG. 4 illustrates an OCR segmentation process 400, in accordance with embodiments of the present invention. The OCR segmentation process 400 is executed to train an image semantic segmentation algorithm resource pool 407 for execution with respect to different text regions 405a . . . 405d (including text portions 414a . . . 414d) from an original text page 402. A noise removal process is executed with respect to the different (semantic) text regions 405a . . . 405d. Likewise, a classification operation is performed resulting in classified categories for algorithm indexes of different recognition methods. Each algorithm index is associated with a specified algorithm of algorithms 407a . . . 407d such that a most suitable recognition algorithm for each text region is selected.

Figure 5:
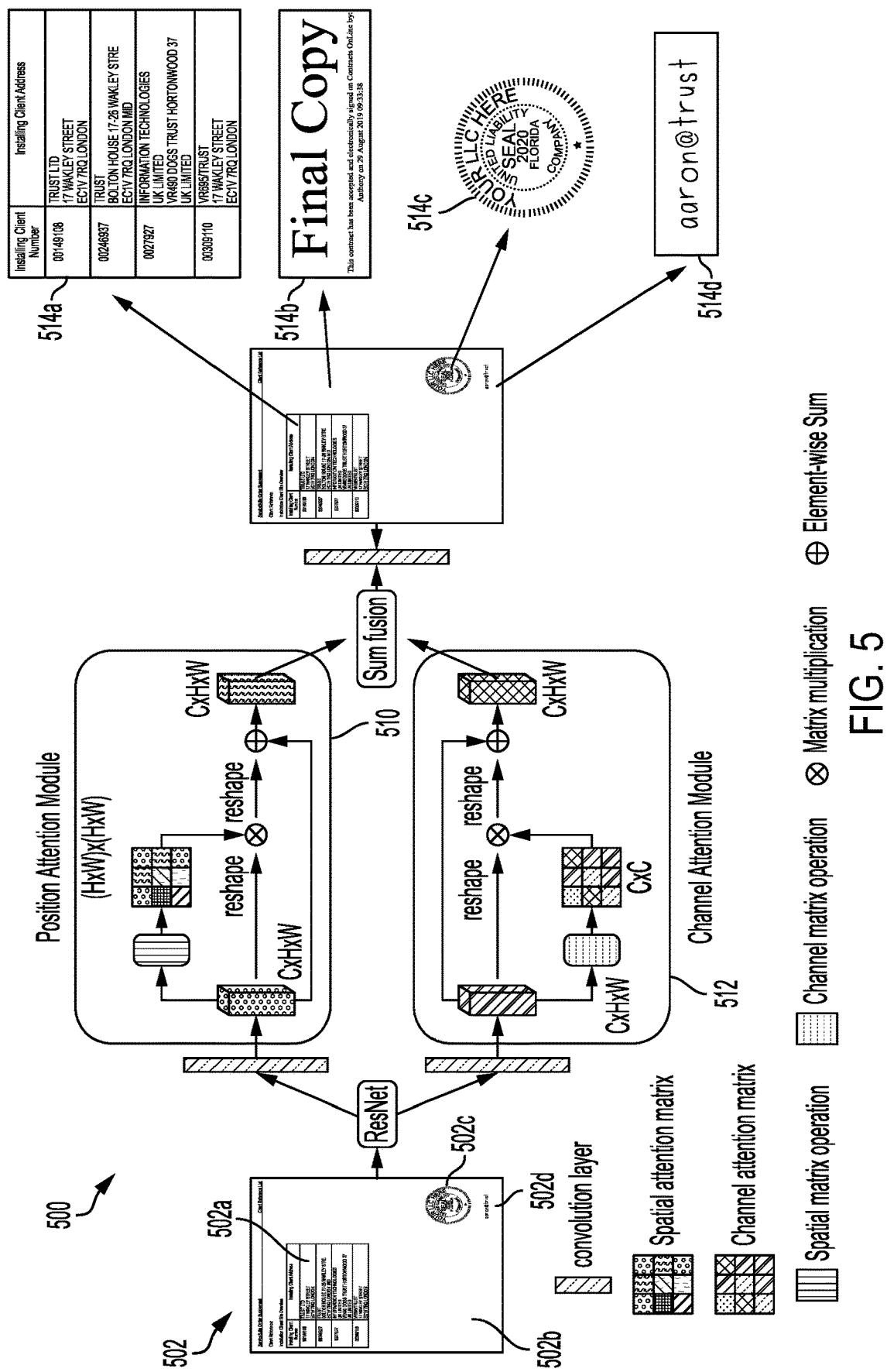
FIG. 5 illustrates a system for executing an image semantic segmentation algorithm with respect to different text regions of a document, in accordance with embodiments of the present invention.

FIG. 5 illustrates a system 500 for executing an image semantic segmentation algorithm with respect to different text regions 502a . . . 502d of a document 502, in accordance with embodiments of the present invention. The image semantic segmentation algorithm is executed via a position attention module 510. Additionally, system 500 is configured to execute an image denoising algorithm based on a self-attention mechanism of a channel attention module 512. The image semantic segmentation algorithm uses an open source algorithm duel attention network for scene segmentation (DANET) to classify each pixel within original document 502 (image). A final result enables the original document 502 to be divided into different semantic regions 514a . . . 514d for coordination for cutting a template area. All target areas are cut into independent semantic units.

Figure 6:
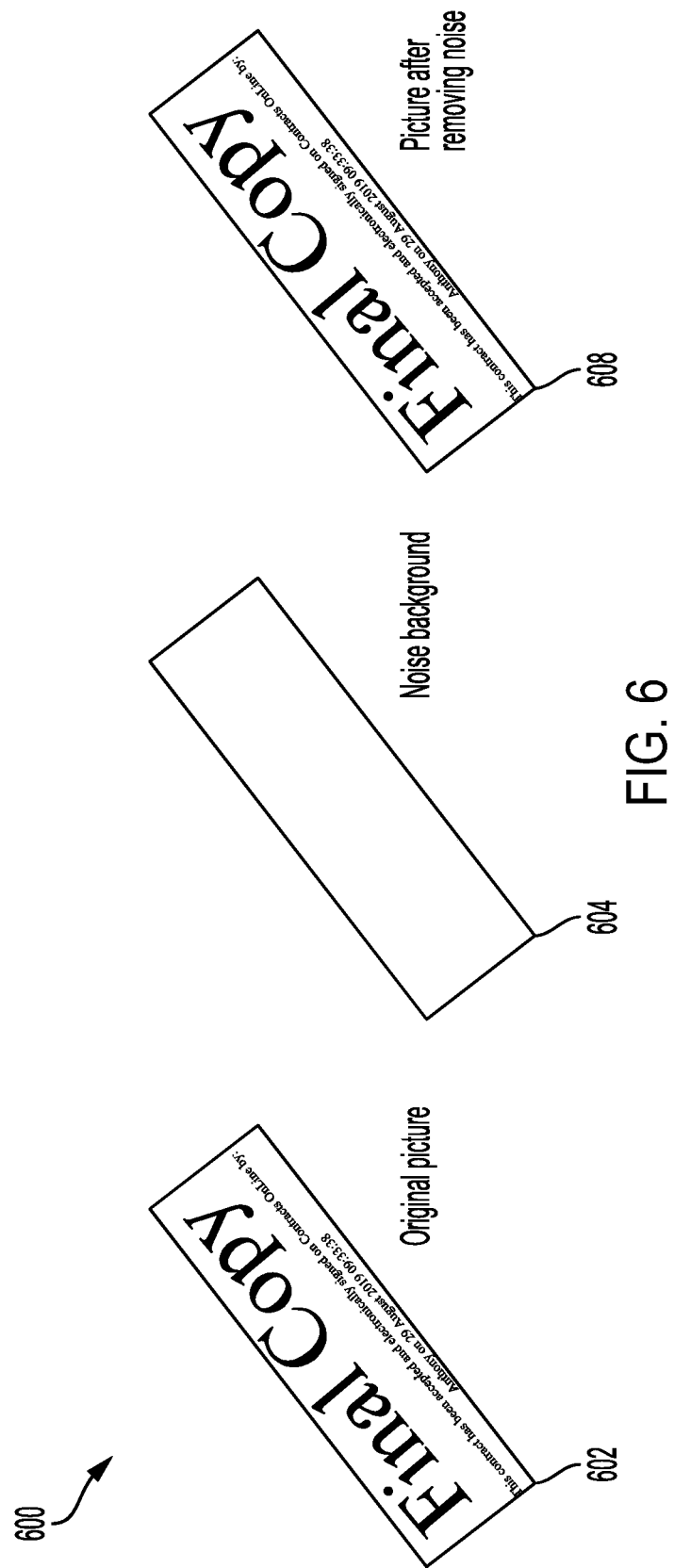
FIG. 6 illustrates a noise removal process, in accordance with embodiments of the present invention.

FIG. 6 illustrates a noise removal process, in accordance with embodiments of the present invention. Prior to noise removal from an original picture 602, additional elements of other semantic units are often included within cut semantic units. The additional elements will become noise (i.e., noise background 604) that interferes with a text recognition process. Therefore, noise background 604 must be removed prior to executing a text recognition process. A self-attention mechanism within a natural language processing (NLP) may be enabled for noise extraction via the following steps:

1. An encoder module is executed to encode an original picture 602 as a 1×300 vector comprising a total semantic vector of original picture 602.

2. A 3×3 window may be enabled to divide original picture 602 into multiple sub-pictures. Each sub-picture is encoded as a 1×300 vector.

3. A total semantic vector of original picture 602 in combination with each 1×300 vector for each sub-picture is enabled to generate a dot product representing a specific score. The score represents an importance of the sub-picture in original picture 602. The aforementioned process allows an information entropy as a filter to: obtain a score threshold, delete all pixels larger than the score to retrieve the noise background 604, and use the original picture 602 to execute a pixel subtraction process to remove noise background 604 and generate a picture 608 after the noise background 604 has been removed.

Figure 7:
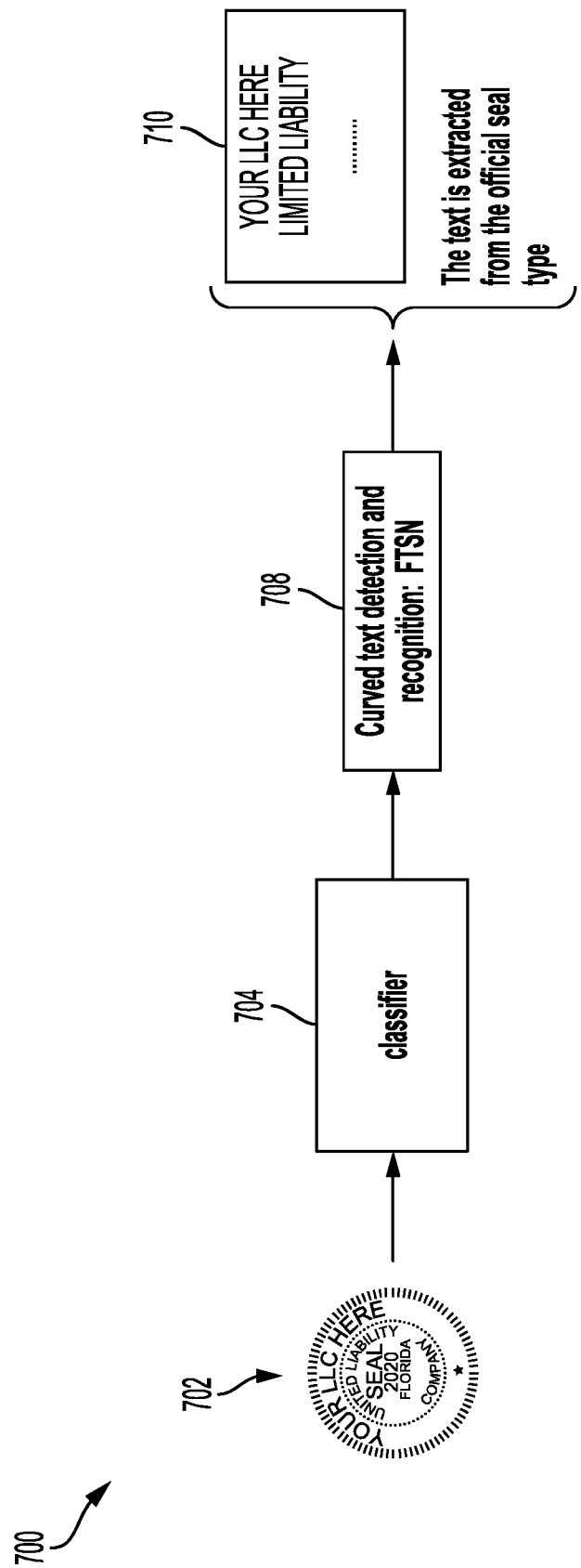
FIG. 7 illustrates a classification algorithm, in accordance with embodiments of the present invention.

FIG. 7 illustrates a classification algorithm 700, in accordance with embodiments of the present invention. With respect to a semantic region 702 generated from a segmentation process, a classification operation 704 is executed such that classified categories are associated with algorithm indexes of different recognition processes. Each algorithm index is associated with a specified algorithm 708 (e.g., a curved text detection and recognition algorithm). The specified algorithm may enable a process for dividing each semantic region and selecting a most suitable recognition algorithm for the associated region. After removing and denoising the independent semantic, classification operation 704 is enabled to recommend a classification type for different independent semantic units to locate a most suitable recognition technology for the different independent semantic units. The aforementioned recognition algorithms are trained in advance and are located within a model pool waiting to be retrieved for operation. When each semantic unit locates its most suitable recognition technology, it is enabled for extracting text 710 with respect to its source.

Figure 8:
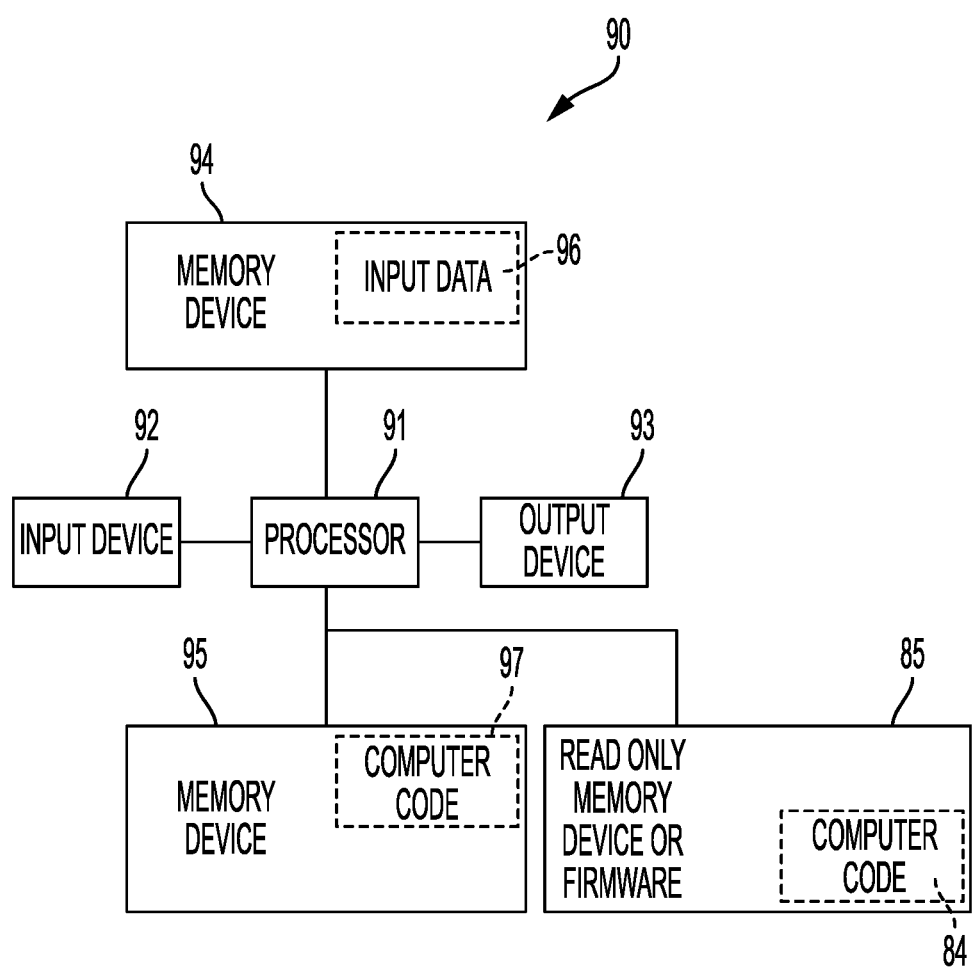
FIG. 8 illustrates a computer system used by the system of FIG. 1 for improving optical character recognition software technology associated with detecting, evaluating, and dividing an electronic document structure into multiple regions for extracting computer readable text within regions of the electronic document structure, in accordance with embodiments of the present invention.

FIG. 8 illustrates a computer system 90 (e.g., hardware device 139 of FIG. 1) used by or comprised by the system of FIG. 1 for improving optical character recognition software technology associated with detecting, evaluating, and dividing an electronic document structure into multiple regions for extracting computer readable text within regions of the electronic document structure, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving optical character recognition software technology associated with detecting, evaluating, and dividing an electronic document structure into multiple regions for extracting computer readable text within regions of the electronic document structure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve optical character recognition software technology associated with detecting, evaluating, and dividing an electronic document structure into multiple regions for extracting computer readable text within regions of the electronic document structure. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving optical character recognition software technology associated with detecting, evaluating, and dividing an electronic document structure into multiple regions for extracting computer readable text within regions of the electronic document structure. In another embodiment, the invention provides a business method that performs the process steps of the invention on a subscription, advertising, and/or fee basis. That is, a service supplier, such as a Solution Integrator, could offer to enable a process for improving optical character recognition software technology associated with detecting, evaluating, and dividing an electronic document structure into multiple regions for extracting computer readable text within regions of the electronic document structure. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a configuration of hardware and software, any configuration of hardware and software, as would be known to a person of ordinary skill in the art, may be utilized for the purposes stated supra in conjunction with the computer system 90 of FIG. 8. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
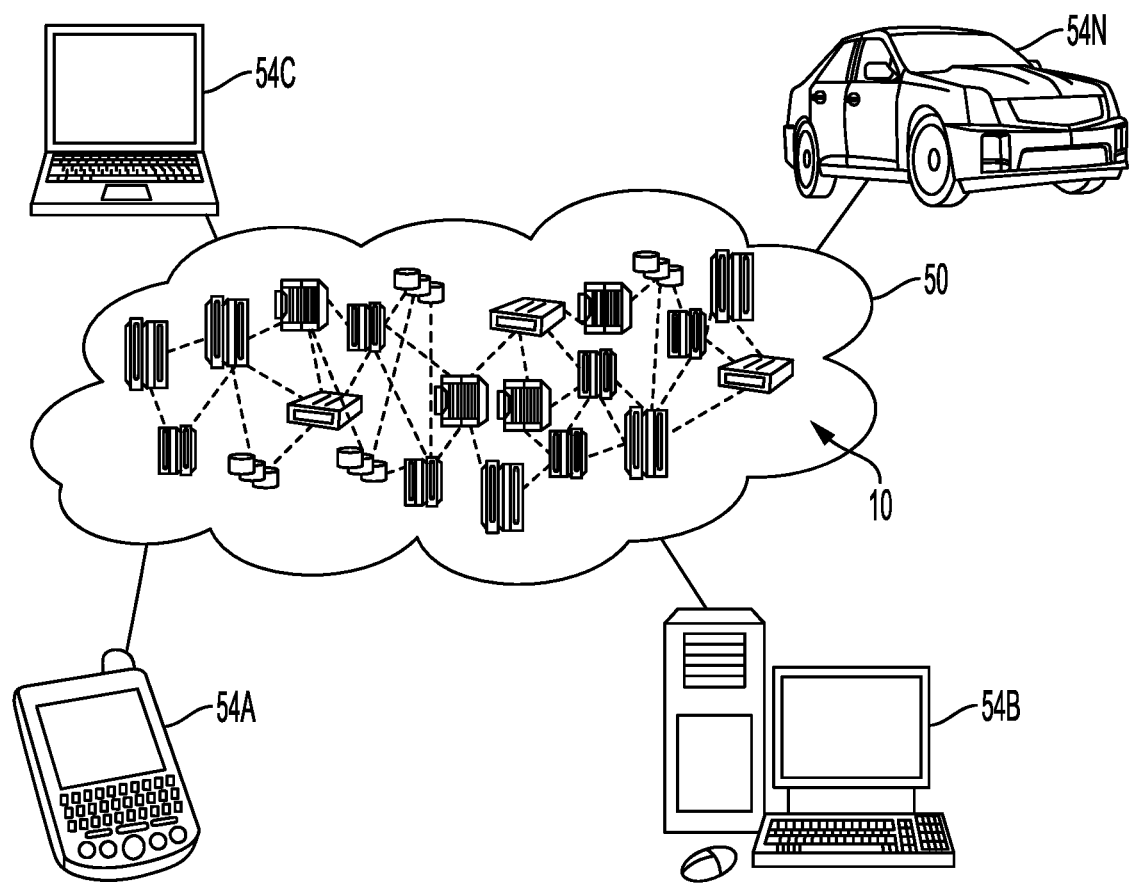
FIG. 9 illustrates a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
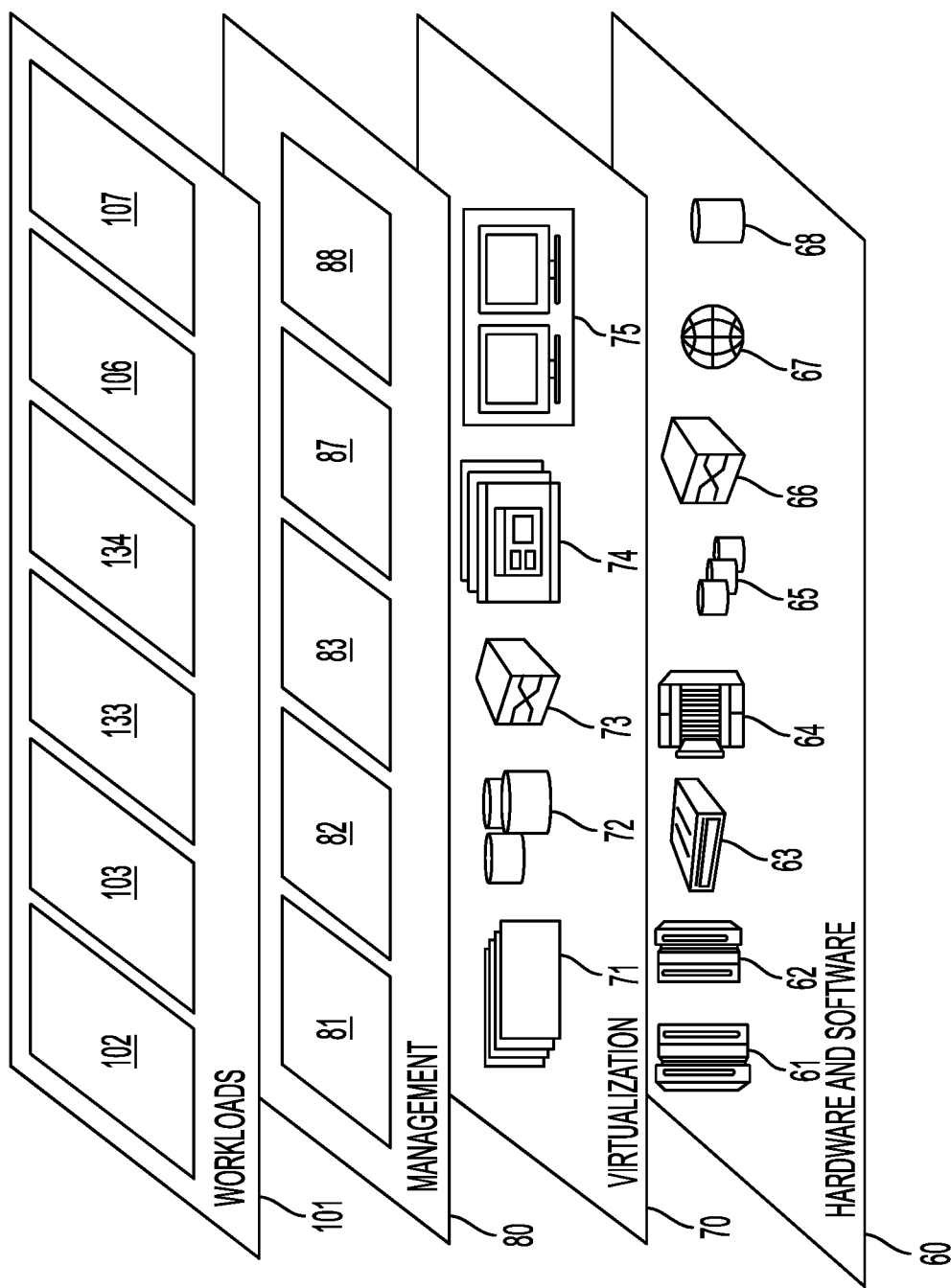
FIG. 10 illustrates a set of functional abstraction layers provided by cloud computing environment, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving optical character recognition software technology associated with detecting, evaluating, and dividing an electronic document structure into multiple regions for extracting computer readable text within regions of the electronic document structure 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An optical character recognition segmentation and processing method comprising:
    receiving, by a processor of a hardware device, a document for processing;
    detecting, by said processor, different types of text data of said document;

dividing, by said processor, said document into a plurality of text regions associated with said different types of said text data, wherein each text region of said plurality of text regions comprises a single type of said text data;

removing, by said processor, optical noise from each said text region, wherein said removing said optical noise from each said text region comprises:

encoding, by said processor, each said text region as a total semantic vector of each said text region;

enabling, by said processor, a 3×3 window to divide each said text region into multiple sub-regions such that each sub-region of said multiple sub-regions is encoded as a 1×300 vector; and generating, by said processor based on said total semantic vector, a dot product for each said sub-region, wherein each said dot product comprises a specific score representing an importance level for each said sub-region;

selecting, by said processor, differing optical character recognition software code for application to each said text region and executing, by said processor in response to said selecting, said differing optical character recognition software code with respect to each said text region resulting in extractable computer readable text within each said text region.

2. The method of claim 1, further comprising:
classifying, by said processor, each said text region with respect to said single type of said text data, wherein said selecting is executed based on results of said classifying.

3. The method of claim 1, wherein said removing said optical noise from each said text region further comprises:
comparing, by said processor, each said specific score to a score threshold; and
deleting, by said processor based on results of said comparing, all pixels of each sub-region exceeding said score threshold to perform said removing.

4. The method of claim 1, wherein said optical noise comprises unnecessary background text and images of said document.

5. The method of claim 1, wherein each said differing optical character recognition software code comprises self-learning software code stored in a specialized database.

6. The method of claim 1, wherein said extractable computer readable text within each said text region is configured for usage with respect to a cut or copy and paste function.

7. The method of claim 1, wherein said different types of text data are comprised by a format selected from the group consisting of a table format, a watermark format, a handwriting format, and a rotated text format.

8. The method of claim 1, further comprising:
providing at least one support service for at least one of creating, integrating, hosting, maintaining, and deploying computer-readable code in the hardware device, said code being executed by the computer processor to implement: said receiving, said detecting, said dividing, said removing, said selecting, and said executing.

9. A computer program product, comprising a computer readable hardware storage device storing a computer readable program code, said computer readable program code comprising an algorithm that when executed by a processor of a hardware device implements an optical character recognition segmentation and processing method, said method comprising:

receiving, by said processor, a document for processing;
detecting, by said processor, different types of text data of said document;
dividing, by said processor, said document into a plurality of text regions associated with said different types of said text data, wherein each text region of said plurality of text regions comprises a single type of said text data;
removing, by said processor, optical noise from each said text region, wherein said removing said optical noise from each said text region comprises:

encoding, by said processor, each said text region as a total semantic vector of each said text region;

enabling, by said processor, a 3×3 window to divide each said text region into multiple sub-regions such that each sub-region of said multiple sub-regions is encoded as a 1×300 vector; and generating, by said processor based on said total semantic vector, a dot product for each said sub-region, wherein each said dot product comprises a specific score representing an importance level for each said sub-region;

selecting, by said processor, differing optical character recognition software code for application to each said text region and executing, by said processor in response to said selecting, said differing optical character recognition software code with respect to each said text region resulting in extractable computer readable text within each said text region.

10. The computer program product of claim 9, wherein said method further comprises:
classifying, by said processor, each said text region with respect to said single type of said text data, wherein said selecting is executed based on results of said classifying.

11. The computer program product of claim 9, wherein said removing said optical noise from each said text region further comprises:
comparing, by said processor, each said specific score to a score threshold; and
deleting, by said processor based on results of said comparing, all pixels of each sub-region exceeding said score threshold to perform said removing.

12. The computer program product of claim 9, wherein said optical noise comprises unnecessary background text and images of said document.

13. The computer program product of claim 9, wherein each said differing optical character recognition software code comprises self-learning software code stored in a specialized database.

14. The computer program product of claim 9, wherein said extractable computer readable text within each said text region is configured for usage with respect to a cut or copy and paste function.

15. The computer program product of claim 9, wherein said different types of text data are comprised by a format selected from the group consisting of a table format, a watermark format, a handwriting format, and a rotated text format.

16. A hardware device comprising a processor coupled to a computer-readable memory unit, said memory unit comprising instructions that when executed by the processor implements an optical character recognition segmentation and processing method comprising:

receiving, by said processor, a document for processing;
detecting, by said processor, different types of text data of said document;

dividing, by said processor, said document into a plurality of text regions associated with said different types of said text data, wherein each text region of said plurality of text regions comprises a single type of said text data;

removing, by said processor, optical noise from each said text region, wherein said removing said optical noise from each said text region comprises:

encoding, by said processor, each said text region as a total semantic vector of each said text region;

enabling, by said processor, a 3×3 window to divide each said text region into multiple sub-regions such that each sub-region of said multiple sub-regions is encoded as a 1×300 vector; and generating, by said processor based on said total semantic vector, a dot product for each said sub-region, wherein each said dot product comprises a specific score representing an importance level for each said sub-region;

selecting, by said processor, differing optical character recognition software code for application to each said text region and executing, by said processor in response to said selecting, said differing optical character recognition software code with respect to each said text region resulting in extractable computer readable text within each said text region.

17. The hardware device of claim 16, wherein said method further comprises:

classifying, by said processor, each said text region with respect to said single type of said text data, wherein said selecting is executed based on results of said classifying.

18. The hardware device of claim 16, wherein said removing said optical noise from each said text region further comprises:

comparing, by said processor, each said specific score to a score threshold; and deleting, by said processor based on results of said comparing, all pixels of each sub-region exceeding said score threshold to perform said removing.

\* \* \* \* \*